July 10, 1945.     W. F. BANKAUF     2,380,013
VIBRATION DAMPER
Filed Sept. 29, 1943
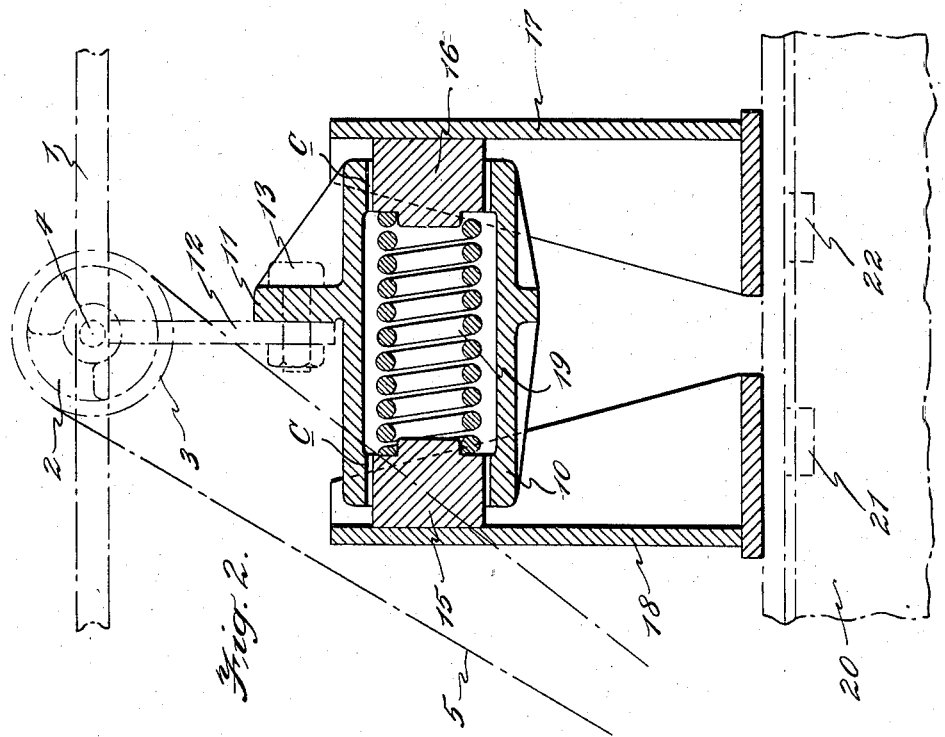
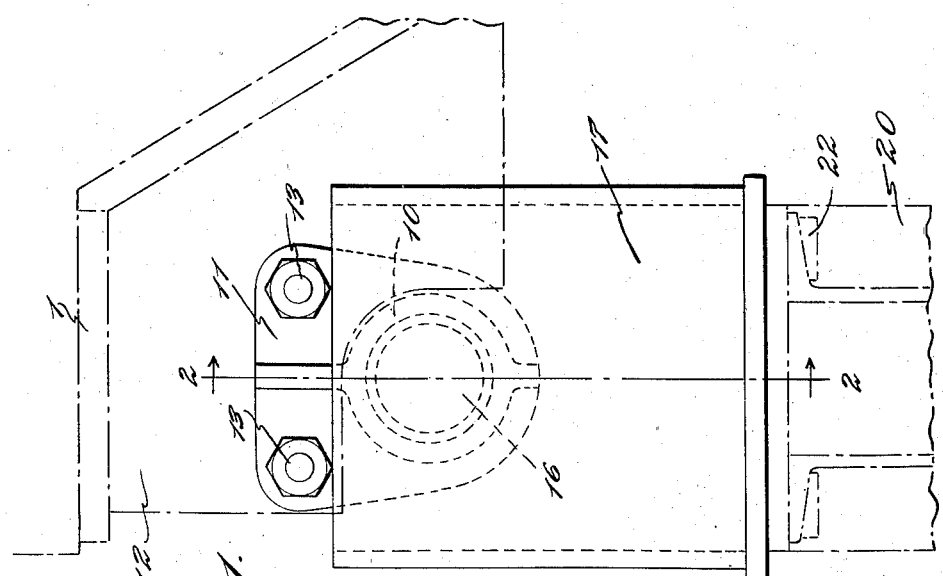
INVENTOR
William F. Bankauf
BY
Gifford, Scull & Burgess
ATTORNEYS Patented July 10, 1945

2,380,013

UNITED STATES PATENT OFFICE 2,380,013

VIBRATION DAMPER

William F. Bankauf, East Paterson, N. J., assignor to Robins Conveyors Incorporated, Passaic, N. J., a corporation of New Jersey Application September 29, 1943, Serial No. 504,243

1 Claim. (Cl. 188—1)

This invention relates to a device for limiting the amplitude of vibration in a mechanical structure. It is illustrated and described as used in conjunction with a vibrating screen or the like.

Looking at the drawing:

Fig. 1 is an end elevation of the device attached to a screen structure; and

Fig. 2 is a section through 2—2 of Fig. 1.

Looking at the drawing, 1 represents the movable framework of a vibrating screen. This framework is mounted on suitable supports (not shown) which will permit oscillation of the framework with a limited amplitude of movement. Vibration of a screen of this kind may be had by rotation of an off-center weight, such as that shown at 2, on pulley 3. Pulley 3 is rotatable on a shaft 4 which, in turn, is mounted on framework 1. A belt 5 is designed to rotate pulley 3.

The vibration damper comprises a hollow cylindrical movable body shown at 10. The outside of body 10 is equipped with bracket 11. A flange 12 secured to the vibratable frame 10 of the screen is adapted to be bolted to the flange 11 by means of bolts 13. The result is that the body 10 of the vibration damper is securely fastened to the frame 1 of the vibrating screen and will move with it.

Inside the body 10 of the vibration damper are friction blocks 15 and 16 designed to press against stationary vertical plates 17 and 18 under the urge of a coil spring 19 which serves to push the blocks 15 and 16 outwardly against the inside face of the plates 17 and 18. The plates 17 and 18 are bolted or otherwise secured to the fixed foundation 20 of the screen. Such bolts are shown at 21 and 22.

In operation, the body 10, attached by means of flange 12 to the vibrating frame 1, vibrates with the frame 1 without engaging the blocks 15 and 16. This is because of clearance at C between the outside of blocks 15 and 16 and the inside of body 10. The amplitude of vibration of the frame 1 is such that the body 10 does not engage the blocks 15 and 16. If the amplitude of such vibration is increased as when the screen passes through a critical vibration point in speeding up or slowing down, the hollow cylindrical body 10 will engage the blocks 15 and 16 so as to move them on the plates 17 and 18. This movement is opposed by the friction between the blocks 15 and 16 and the plates 17 and 18, which friction is a function of the pressure exerted by the coil spring 19.

While I have shown the invention as embodied in a specific form, it is to be understood that various changes in details may be made without departing from the scope of the invention as defined by the appended claim.

I claim:

In a device of the character described, a body for attachment to a continuously vibrating member having means for vibrating the member at a predetermined amplitude, means located in said body and spaced therefrom, means cooperating with said last means to form a damping means engaging the body when the amplitude of vibration increases beyond the said predetermined amplitude, said first means spaced a sufficient distance so that the body only engages the damping means to limit the vibration when the vibration increases beyond the predetermined amplitude as when the vibrating member passes through a critical point in speeding up or slowing down.

WILLIAM F. BANKAUF.